(12) United States Patent
Filippini et al.

(10) Patent No.: US 7,301,999 B2
(45) Date of Patent: Nov. 27, 2007

(54) QUANTIZATION METHOD AND SYSTEM FOR VIDEO MPEG APPLICATIONS AND COMPUTER PROGRAM PRODUCT THEREFOR

(75) Inventors: Gianluca Filippini, Sospiro (IT); Emiliano Mario Piccinelli, Monza (IT); Danilo Pietro Pau, Sesto San Giovanni (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 821 days.

(21) Appl. No.: 10/757,961

(22) Filed: Jan. 14, 2004

(65) Prior Publication Data

US 2004/0170395 A1 Sep. 2, 2004

(30) Foreign Application Priority Data

Feb. 5, 2003 (EP) ................... 03002443

(51) Int. Cl.
*H04B 1/66* (2006.01)
(52) U.S. Cl. .................. 375/240.03; 375/240.02; 375/240.16; 375/240.12
(58) Field of Classification Search ................ 345/660, 345/447, 505, 629, 558, 520, 547, 531, 535; 386/111, 112, 109, 129, 46; 375/240.12, 375/240.02, 240.03, 240.16; 348/446; 382/100
See application file for complete search history.

(56) References Cited

U.S. PATENT DOCUMENTS 5,225,904 A * 7/1993 Golin et al. ........... 375/240.12
5,887,115 A * 3/1999 Boyce et al. ............... 386/129
5,920,354 A * 7/1999 Fedele ........................ 348/446
6,466,623 B1 * 10/2002 Youn et al. ............ 375/240.16
6,614,914 B1 * 9/2003 Rhoads et al. .............. 382/100

(Continued)

FOREIGN PATENT DOCUMENTS

EP     0 509 576 A2    10/1992
WO    WO 01/95633      12/2001

OTHER PUBLICATIONS

Chen, "Elimination of Subband-Coding Artifacts Using the Dithering Technique" Proceedings of the International Conference on Image Processing (ICIP), IEEE Comp. Soc. Press, vol. 3, Conf. 1, Nov. 13, 1994, Austin, pp. 874-877.
Petri, "Dither signals and quantization", Measurement, Institute of Measurement and Control. vol. 19, No. 3, Nov. 1, 1996, London, pp. 147-157.

(Continued)

*Primary Examiner*—Prabodh Dharia
(74) *Attorney, Agent, or Firm*—Hogan & Hartson LLP (57) ABSTRACT

Digital signals are converted between a first and second format by a conversion process including generating coefficients representing the digital signals. The coefficients may be discrete cosine transform coefficient generated during encoding/transcoding of MPEG signals. The coefficients are subject to quantization by generating a dither signal that is added to the coefficients before quantization to generate a quantized signal. Preferably, each coefficient is first subject to a first quantization in the absence of any dither signal added to generate an undithered quantized coefficient. If the undithered quantized signal is equal to zero the undithered quantized coefficient is taken as the output quantized signal. If the undithered quantized coefficient is different from zero, the dither signal is added and the dithered coefficient thus obtained is subject to quantization to generate the output quantized signal.

39 Claims, 3 Drawing Sheets

U.S. PATENT DOCUMENTS

| | | | |
|---|---|---|---|
| 6,628,300 B2* | 9/2003 | Amini et al. | 345/660 |
| 6,718,047 B2* | 4/2004 | Rhoads | 382/100 |
| 6,944,226 B1* | 9/2005 | Lin et al. | 375/240.2 |
| 7,024,172 B1* | 4/2006 | Murphy et al. | 455/324 |
| 2002/0085634 A1* | 7/2002 | Morel | 375/240.03 |
| 2004/0170381 A1* | 9/2004 | Srinivasan | 386/46 |
| 2005/0024369 A1* | 2/2005 | Xie | 345/547 |

OTHER PUBLICATIONS

Papoulis, "Probability, random variables, and stochastic processes", McGraw-Hill, 1991, p. 101.

Wang, et al. "Dynamic Rate Scaling of Coded Digital Video for IVOD Applications" IEEE Transactions on Consumer Electronics, IEEE, Inc., vol. 44, No. 3, Jun. 2, 1998, New York, pp. 743-749.

* cited by examiner

Fig_1
PRIOR ART

Fig_2
PRIOR ART

Fig_3

Fig_4

Fig_5

Fig_6

Fig_7

Fig_8

Fig_9

Fig_10

QUANTIZATION METHOD AND SYSTEM FOR VIDEO MPEG APPLICATIONS AND COMPUTER PROGRAM PRODUCT THEREFOR

BACKGROUND OF THE INVENTION

1. Field of the Invention

The present invention relates to techniques for encoding/transcoding digital video sequences.

2. Background of the Invention

With the advent of new media, video compression is increasingly being applied. In a video broadcast environment, a variety of channels and supports exist, associated to a variety of standard for content encoding and decoding.

Of all the standards available, MPEG (a well known acronym for Moving Pictures Experts Group) is nowadays adopted worldwide for quite different applications.

An example is the transmission of video signals both for standard television (SDTV) and high definition television (HDTV). HDTV demands bit rates up to 40 Mbit/s: MPEG is thus widely used for Set-Top-Box and DVD applications.

Another example is the transmission over an error prone channel with a very low bitrate (down to 64 Kbit/s) like the Internet and third generation wireless communications terminals.

One of the basic blocks of an encoding scheme such as MPEG is the quantizer: this is a key block in the entire encoding scheme because the quantizer is where the original information is partially lost, as a result of spatial redundancy being removed from the images. The quantizer also introduces the so called "quantization error", which must be minimized, especially when a re-quantization step takes place as is the case i.a. when a compressed stream is to be re-encoded for a different platform, channel, storage, etc.

Another important block, common to both encoding and transcoding systems, is the rate control: this block is responsible for checking the real output bit-rate generated, and correspondingly adjust the quantization level to meet the output bitrate requirements as needed.

The MPEG video standard is based on a video compression procedure that exploits the high degree of spatial and temporal correlation existing in natural video sequences.

Figure 1:
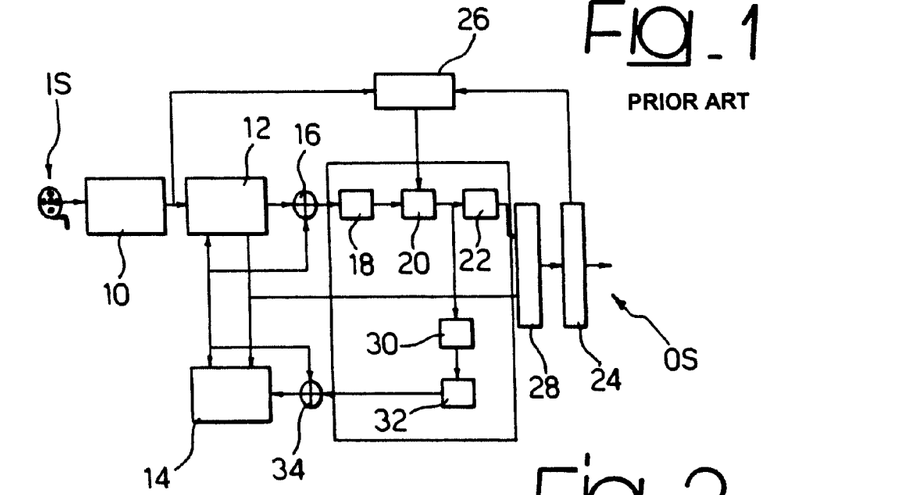

As shown in the block diagram of FIG. 1, an input video sequence is subject to frame reorder at 10 and then fed to a motion estimation block 12 associated with an anchor frames buffer 14. Hybrid DPCM/DCT coding removes temporal redundancy using inter-frame motion estimation. The residual error images generated at 16 are further processed via a Discrete Cosine Transform (DCT) at 18, which reduces spatial redundancy by de-correlating the pixels within a block and concentrating the energy of the block into a few low order coefficients. Finally, scalar quantization (Quant) performed at 20 and variable length coding (VLC) carried out at 22 produce a bitstream with good statistical compression efficiency.

Due to the intrinsic structure of MPEG, the final bitstream is produced at a variable and unconstrained bitrate; hence, in order to control it or when the output channel requires a constant bitrate, an output buffer 24 and a feedback bitrate controller block 26, which defines the granularity of scalar quantization, must be added.

In the block diagram of FIG. 1, reference number 28 designates a multiplexer adapted for feeding the buffer 24 with either the VLC coded signals or signals derived from the motion estimation block 12, while references 30, 32, and 39 designate an inverse quantizer, an inverse DCT (IDCT) module and a summation node included in the loop encoder to feed the anchor frames buffer 14.

All of the foregoing is well known to those of skill in the art, thus making a more detailed explanation unnecessary under the circumstances.

The MPEG standard defines the syntax and semantics of the output bit-stream OS and the functionality of the decoder. However, the encoder is not strictly standardized: any encoder that produces a valid MPEG bitstream is acceptable.

Motion estimation is used to evaluate similarities among successive pictures, in order to remove temporal redundancy, i.e. to transmit only the difference among successive pictures. In particular, block matching motion Estimation (BM-ME) is a common way of extracting the existing similarities among pictures and is the technique selected by the MPEG-2 standard.

Recently, adapting the multimedia content to the client devices is becoming more and more important, and this expands the range of transformations to be effected on the media objects.

General access to multimedia contents can be provided in two basic ways.

The former is storing, managing, selecting, and delivering different versions of the media objects (images, video, audio, graphics and text) that comprise the multimedia presentations.

The letter is manipulating the media objects "on the fly", by using, for example, methods for text-to-speech translation, image and video transcoding, media conversion, and summarization.

Multimedia content delivery thus can be adapted to the wide diversity of client device capabilities in communication, processing storage and display.

In either basic ways considered in the foregoing, the need for converting a compressed signal into another compressed signal format occurs. A device that performs such an operation is called a transcoder. Such a device could be placed in a network to help relaying transmissions between different bit rates or could be used as a pre-processing tool to create various versions of the media objects possibly needed as mentioned in the foregoing.

For example, a DVD movie MPEG-2 encoded at 8 Mbit/s at standard definition (Main Profile at Main Level) may be selected by a user wishing to watch it using a portable wireless device assisted by a CIF display. To permit this, the movie must be MPEG-2 decoded, the picture resolution changed from standard definition to CIF and then MPEG-4 encoded. The resulting bitstream at, i.e., 64 Kbit/s is thus adapted to be transmitted over a limited bandwidth error-prone channel, received by the portable device and MPEG-4 decoded for related display. The issue is therefore to cleverly adapt the bitrate and the picture resolution of a compressed data stream compliant to a certain video standard (e.g. MPEG-2) to another one (e.g. MPEG-4).

A widely adopted procedure is to decode the incoming bitstream, optionally to down-sample the decoded images to generate a sequence with a reduced picture size, and then re-encode the sequence with a new encoder configured to achieve the required bitrate.

Alternative methods have been developed as witnessed, e.g. by EP-A-1 231 793, EP-A-1 231 794 or European patent application No. 01830589.6. These and similar systems are adapted to work directly in the DCT domain, incorporating the decoder and the encoder, and re-utilizing useful information available (like motion vectors, for example).

These systems are adapted to remove unnecessary redundancies present in the system. In any case, a de-quantization followed by a re-quantization step (called "requantizer") is usually required together with an output rate control function.

Theory of Quantization Processes

In order to better understand the background of the invention, the inherent drawbacks and problems of the related art as well as the solution provided by the invention, a general mathematical description of quantization processes will be presented, followed by a cursory description of possible applications in video compression and transcoding techniques.

Given a number x, quantization can be described as follows:

$$y = y_k \text{ if } x \in I_k$$

where $y_k$ is the quantized value of x and all $I_k$ are ranges like $$I_k = x_k \leq x \leq x_{k+1}, k = 1, 2, \ldots, L$$

After that, the group of ranges and the values to be associated to each one of them will be defined. Starting from the definition of "quantization error" as follows:

$$e_q(x) = |y_k - x|$$

of all the quantization step groups, the optimal one (Iopt) minimizes the average quantization error $e_q$:

$$I_{opt} : \min_x \int_{x_0}^{x_L} e_q(x) \cdot p(x) dx$$

where p(x) is the probability distribution of the independent variable x.

Considering the range $[x_k, x_{k+1}]$, and $y_k = y_{k+d}$, the quantization error in the range can be calculated as follow:

$$e_q = \int_{x_k}^{x_{k+1}} e_q(x) \cdot p(x) dx = \int_{x_k}^{x_{k+1}} |x_k + d - x| \cdot p(x) dx$$

$$= \int_{x_k}^{x_{k+d}} (x_k + d - x) \cdot p(x) dx + \int_{k+d}^{k+1} (x - x_k - d) \cdot p(x) dx$$

$$= (x_k + d) \cdot \int_{x_k}^{x_{k+d}} p(x) dx - (x_k + d) \cdot \int_{x_{k+d}}^{x_{k+1}} p(x) dx +$$

$$\int_{x_{k+d}}^{x_{k+1}} x \cdot p(x) dx - \int_{k}^{x_{k+d}} x \cdot p(x) dx$$

$$= (x_k + d) \cdot \left[ \int_{x_k}^{x_{k+d}} p(x) dx - \int_{x_{k+d}}^{x_{k+1}} p(x) dx \right] +$$

$$\int_{x_{k+d}}^{x_{k+1}} x \cdot p(x) dx - \int_{x_k}^{x_{k+d}} x \cdot p(x) dx$$

In this way, the quantization error in each quantization ranges depends on the distance d of $y_k$ from its left extremity $x_k$. Because the goal is to minimize this error, the zeros of the first derivative have to be located as a function of d.

In other words $$\frac{\partial}{\partial d} \int_{x_h}^{x_k+d} f(x) dx = \lim_{h \to 0} \frac{\int_{xk}^{x_{h+d+k}} f(x) dx - \int_{x_h}^{x_{h+d}} f(x) dx}{h}$$

$$= \lim_{h \to 0} \frac{\int_{x_{h+d}}^{x_{h+d+h}} f(x) d(x)}{h}$$

$$= \lim_{h \to 0} \frac{F(x_k + d + h) - F(x_k + d)}{h}$$

$$= \frac{\partial}{\partial d} F(x_k + d) = f(x_k + d)$$

In the same way, $$\frac{\partial}{\partial d} \int_{x_{h+d}}^{x_k} f(x) dx = \lim_{h \to 0} \frac{\int_{x_{k+d+h}}^{x_h} f(x) dx - \int_{x_{h+d}}^{x_h} f(x) dx}{h}$$

$$= \lim_{h \to 0} \frac{\lim_{k+d+h}^{x_h} f(x) d(x)}{h}$$

$$= \lim_{h \to 0} \frac{F(x_k + d) - F(x_k + d + h)}{h}$$

$$= -\frac{\partial}{\partial d} F(x_k + d) = -f(x_k + d)$$

It is now possible to calculate the derivative of the error with respect to d:

$$\frac{\partial}{\partial d} e_q = \int_{x_h}^{x_{h+d}} p(x) dx - \int_{x_{h+d}}^{x_{h+1}} p(x) dx + (x_k + d) \cdot$$

$$[p(x_k + d) + p(x_k + d)] + -$$

$$[(x_k + d) \cdot p(x_k + d) + (x_k + d) \cdot p(x_k + d)]$$

$$= \int_{x_h}^{x_{h+d}} p(x) dx - \int_{x_{h+d}}^{x_{h+1}} p(x) dx = 0 \Rightarrow$$

$$y_k : \int_{x_h}^{x_{h+d}} p(x) dx = \int_{x_{h+d}}^{x_{h+1}} p(x) dx$$

Therefore, the point of minimum error corresponds with the median of the range.

In the same way, it is possible to demonstrate that, starting from a range $[X_k, X_{k+1}]$, the best subdivision in two different intervals $$[x_k, x_{k+1}] = [x_k, x_j] \cup [x_j, x_{k+1}] \text{ with } x_k \leq x_j \leq x_{k+1}$$

is the one that leads to equality of the two following functions in the two sub-ranges:

$$x_j : \int_{x_k}^{x_j} p(x) dx = \int_{x_j}^{x_{k+1}} p(x) dx$$

From this, Iopt represents all the ranges with equal probability, univocally defined by L.

"Quantization", in the video compression context, requires that each 16 bit coefficient (with sign) from the DCT transform of the prediction error is associated to a sub-set of discrete numbers, smaller than the original one, reducing, in this way, the spatial redundancy of the signal.

Quantization of the DCT coefficients plays a key role in compression processes (this being true not just for the video context), since the final bitrate depends very strictly on this stage of the process. Specifically, the DCT transformation concentrates the energy associated to the input signal (e.g. the images of a video sequence) into small number of coefficients, which represent the lowest spatial frequencies. However the DCT transformation does not reduce the amount of data needed to represent the information. This means that, by applying a coarse quantization on these coefficients, a large number of zero coefficients can be removed from the high frequency region of each macroblock (where the human eye is less sensitive), thus achieving a true reduction of information.

Figure 2:
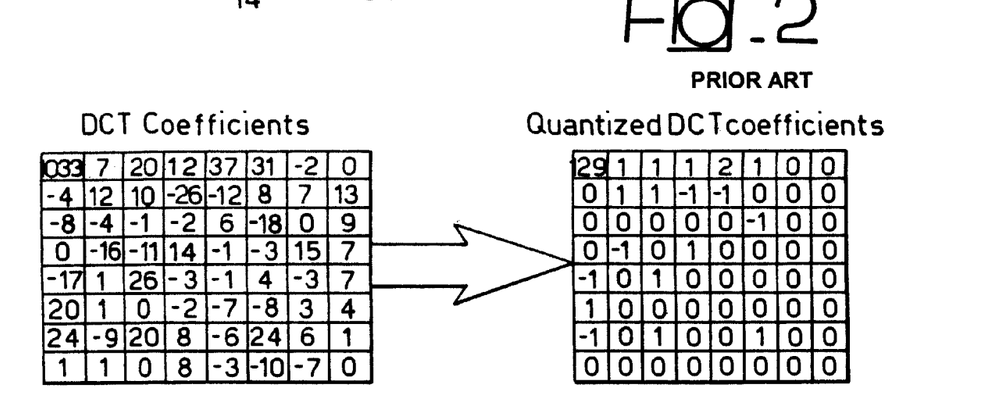

This is shown by way of example in FIG. 2, which represents an example of DCT coefficient quantization.

This is the only one step that is not reversible in the compression chain (i.e. the relevant information is not transformed but at least partly lost).

In the Intra-Coded macroblocks, briefly "Intra", belonging to the Intra-Coded frames ("I") or to the Predicted frames ("P" or "B") the DC component of each macroblock (the first coefficient in the upper left corner) and the AC components (all the other coefficients) are quantized separately, using the following rules:

$$C(0,0) = \left[\frac{F(0,0) \pm 4}{8}\right]$$

$$A(u,v) = \left[\frac{16 \cdot F(u,v) \pm \frac{Q(u,v)}{2}}{Q(u,v)}\right]$$

$$C(u,v) = \left[\frac{A(u,v) \pm Q_F}{2 \cdot Q_F}\right]$$

where $C(u,v)$ are the quantized coefficients, $F(u,v)$ are the DCT coefficients, $Q(u,v)$ is the quantization step, $Q_F$ is a quantization parameter and the sign is the sign of $F(u,v)$.

The inverse quantization is obtained from the following rules:

$$F(0,0) = 8 \cdot C(0,0)$$

$$F(u,v) = \frac{C(u,v)Q(u,v)Q_F}{8}$$

For those macroblocks which are predicted or interpolated, belonging thus to Predicted or Bidirectionslly Predicted frames (briefly "P" or "B" frames), the quantization process is the following:

$$A(u,v) = \left[\frac{16 \cdot F(u,v) \pm \frac{Q(u,v)}{2}}{Q(u,v)}\right]$$

$$C(u,v) = \begin{cases} \frac{A(u,v)}{2Q_F} & \text{odd} \\ \frac{A(u,v) \pm 1}{2Q_F} Q_F & \text{even} \end{cases}$$

and the sign used is the sign of $A(u,v)$.

The inverse quantization is obtained as follows:

$$F(u,v) = \frac{(2F(u,v)+1) \cdot Q_F \cdot Q(u,v))}{16}$$

The rate control algorithm calculates the $Q_F$ parameter, which represents the real quantization level.

To sum up, the quantization step is where the compression process becomes lossy, in the sense that the errors introduced are no longer recoverable. The total error depends on the spatial position of each coefficient in the block that contains it, and from the number of bits already spent from the beginning of the picture until the current macroblock (because the $Q_F$ parameter can be changed for each macroblock).

The minimum possible error is zero, when the quantizing coefficient is a multiple of the quantization step; the maximum possible error is equal to half the quantization step that contains the quantizing coefficient (referring to a non linear quantization scale). This means that if quantization is too "hard" (the $Q_F$ parameter having a high value) the resulting image will be appreciably degraded and the block artifacts visible. On the other hand, if the quantization is too "soft", the resulting images will be significantly more detailed, but a higher number of bits will be required to encode them.

In the MPEG-2 standard, the DCT coefficients integer range of variability is [−2048, 2047]: the total number of quantization intervals L, depending on mQuant (the quantization level parameter, calculated by the rate control algorithm) is:

$$L = \frac{4096}{mQuant}$$

For the Inter macroblocks, it is not generally possible to find a probability distribution of the coefficients (coding the prediction error). In fact, this depends on the input signal and the motion estimator characteristics. Recently, it has been demonstrated that it is possible to approximate a Laplacian distribution also for this kind of DCT coefficients, but the variability of its parameters are much bigger than for the Intra case. For this reason, a uniform distribution is currently assumed. The original coefficient is divided by the value mQuant, while moving toward the nearest integer.

For the Intra macroblocks, the probability distribution of the DCT coefficients (excluding the DC coefficient) can be very well approximated by a Laplacian curve, centered on the zero value.

Referring, by way of example, to the first 100 frames of the standard sequence known as Mobile & Calendar, the distribution of the corresponding AC-DCT coefficients may be well approximated by a Laplacian curve with parameter λ=0.055. The parameter λ can be very easily found, considering the Laplacian curve equation:

$$p(x) = \frac{\lambda}{2} \cdot e^{-\lambda|x|}$$

Calculating experimentally the variance of the AC coefficients σ, the best Laplacian curve fitting the given points can be found as follow.

$$\sigma^2 = \int_{-\infty}^{\infty} (x - E(x))^2 \cdot p(x)\,dx$$

$$= \int_{-\infty}^{\infty} x^2 \cdot \frac{\lambda}{2} \cdot e^{-\lambda|x|}\,dx$$

$$= \frac{1}{2}\left[e^{\lambda x} \cdot \left(x^2 - \frac{2 \cdot x}{\lambda} + \frac{2}{\lambda^2}\right)\Big|_{-\infty}^{0} + e^{-\lambda x} \cdot \left(x^2 + \frac{2 \cdot x}{\lambda} + \frac{2}{\lambda^2}\right)\Big|_{0}^{\infty}\right]$$

$$= \frac{1}{2} \cdot \left(\frac{2}{\lambda^2} + \frac{2}{\lambda^2}\right)$$

$$= \frac{2}{\lambda^2}$$

$$\lambda = \frac{\sqrt{2}}{\sigma}$$

Theoretically speaking, because a coefficient is sought to be quantized with quantization parameter mQuant, one must find all the $$\frac{4096}{mQuant}$$

intervals with the same probability, and, for each one of them, the median value, the true goal being minimizing not the absolute quantization error, but rather its average value. Moreover, using for each interval the median value is important also for the subsequent VLC compression (shorter words will be associated with more frequent values): this increases the maximum quantization error. AS this is not a probable event, better compression with a minimized mean square error is allowed.

For practical implementations, it is in any case preferable to simplify the quantizer, using again the one used for the Inter case. To do that, it is necessary to apply some modifications to the input coefficients, to adapt them to the different probability curve. In the Test Model Five (TM5), all the AC coefficient are pre-quantized using a matrix of fixed coefficients that eliminates all the frequency that are not perceptible; after that, adaptive quantization is applied, proportional to the parameter mQuant needed.

Analyzing the function, each AC-DCT coefficient is quantized following this expression:

$$QAC = \frac{\dfrac{16 \cdot ac + \dfrac{W}{2}}{W} + \dfrac{3}{4} \cdot mquant - mquant}{2 \cdot mquant}$$

$$= \frac{\tilde{ac} - \dfrac{mquant}{4}}{2 \cdot mquant}$$

$$= \frac{\tilde{ac}}{\delta} - \frac{1}{8}$$

This means that to each quantization interval ($\delta$) will be associated a value which does not represent the mean value, but the mean value decremented by ⅛. This confirms that, since the probability distribution is not uniform in each interval (but can be approximated by a Laplacian curve) the most representative value of the interval itself is the median, which also minimizes the quantization error).

As already indicated, MPEG2 standard defines syntax and semantics of the transmitted bitstream and the functionalities of the decoder. However, the encoder is not strictly standardized: any encoder that produces a valid MPEG2 bitstream is acceptable. The standard puts no constraints on important processing steps such as motion estimation, adaptive scalar quantization, and bit rate control.

This last issue plays a fundamental role in actual systems working at Constant Bit Rate (briefly CBR). Due to the intrinsic structure of MPEG2, the final bitstream is produced at variable bit rate, hence it has to be transformed to constant bit rate by the insertion of an output buffer which acts as feedback controller. The buffer controller aims at achieving a target bit rate with consistent visual quality. It monitors the amount of bits produced at a macroblock-by-macroblock level and dynamically adjusts the quantization parameters for the subsequent ones, according to its fullness status and to the image complexity.

Bit rate control is a central problem in designing moving pictures compression systems. It is essential to ensure that the number of bits used for a group of pictures (GOP) is as close as possible to a predetermined one. This is especially relevant in magnetic recording, and more in general, in those applications where strong constraints exist on instantaneous bitrate. In fact, in order to realize playback "trick" modes, such as "fast forward", it is necessary to start I-pictures at regularly spaced positions on the tape. In this kind of reproduction only the Intra pictures can be visualized: they allow a random access to the sequence since they are coded independently. Search is performed with a jump close to the GOP (Group Of Pictures) start code and then with a read step in the bitstream until the image starts. Hence, only the first image of the GOP is to be decoded.

A constant bit rate per GOP is also an advantageous solution in the case of bitstream editing. It makes it possible to take a small part of the sequence, modify, re-encode and put it exactly where it was in the bitstream. Bit rate control algorithms based on pre-analysis can produce output bit rates that are very close to the desired one. They use information from a pre-analysis of the current picture, where such pre-analysis is a complete encoding of the image with a constant quantizer. Since the current picture is analyzed and then quantized, scene changes have no influence on the reliability of the pre-analysis.

A procedure for controlling the bit-rate of the Test Model by adapting the macroblock quantization parameter is known as the Test Model 5 (TM5) rate control algorithm. The algorithm works in three steps:

i) Target bit allocation: this step estimates the number of bits available to code the next picture. It is performed before coding the picture.

ii) Rate control: this step sets by means of a "virtual buffer" the reference value of the quantization parameter for each macroblock.

iii) Adaptive quantization: this step modulates the reference value of the quantization parameter according to the spatial activity in the macroblock to derive the value of the quantization parameter, mquant, which is used to quantize the macroblock.

A first phase in the bit allocation step is complexity estimation. After a picture of a certain type (I, P, or B) is encoded, the respective "global complexity measure" ($X_i$, $X_p$, or $X_b$) is updated as:

$$X_i = S_i\, Q_i,\quad X_p = S_p\, Q_p,\quad X_b = S_b\, Q_b$$

where $S_i$, $S_p$, $S_b$ are the numbers of bits generated by encoding this picture and $Q_i$, $Q_p$ and $Q_b$ are the average quantization parameter computed by averaging the actual quantization values used during the encoding of the all the macroblocks, including the skipped macroblocks.

The initial values are:
Xi=160*bit_rate/115
Xp=60*bit_rate/115
Xb=42*bit_rate/115 where bit_rate is measured in bits/s.

Subsequently, in the picture target-setting phase, the target number of bits for the next picture in the Group of Pictures (Ti, Tp, or Tb) is computed as:

$$T_i = \max\left\{\frac{R}{1+\frac{N_p X_p}{X_i K_p}+\frac{N_b X_b}{X_i K_b}}, \text{bit\_rate}/(8*\text{picture\_rate})\right\}$$

$$T_p = \max\left\{\frac{R}{N_p+\frac{N_b K_p X_b}{K_b X_p}}, \text{bit\_rate}/(8*\text{picture\_rate})\right\}$$

$$T_b = \max\left\{\frac{R}{N_b+\frac{N_p K_b X_p}{K_p X_b}}, \text{bit\_rate}/(8*\text{picture\_rate})\right\}$$

Where:

Kp and Kb are "universal" constants dependent on the quantization matrices; acceptable values for these are Kp=1.0 and Kb=1.4.

R is the remaining number of bits assigned to the Group of Pictures. R is updated as follows.

After encoding a picture, R=R−Si,p,b where is Si,p,b is the number of bits generated in the picture just encoded (picture type is I, P or B).

Before encoding the first picture in a Group of Pictures (an I-picture):
R=G+R
G=bit_rate*N/picture_rate
N is the number of pictures in the Group of Pictures.
At the start of the sequence R=0.

Np and Nb are the number of P-pictures and B-pictures remaining in the current Group of Pictures in the encoding order.

A subsequent step in the process is local control.

Before encoding macroblock j (j>=1), the "fullness" of the appropriate virtual buffer is computed as:

$$d_j^i = d_0^i + B_{j-1} - \frac{T_i(j-1)}{MB\_cnt}$$

or $$d_j P = d_0 P + B_{j-1} - \frac{T_p(j-1)}{MB\_cnt}$$

or $$d_j^b = d_0^b + B_{j-1} - \frac{T_b(j-1)}{MB\_cnt}$$

depending on the picture type, where:

$d_0^i, d_0^p, d_0^b$ are initial fullnesses of virtual buffers—one for each picture type.

$B_j$ is the number of bits generated by encoding all macroblocks in the picture up to and including j.

MB_cnt is the number of macroblocks in the picture.

$d_j^i, d_j^p, d_j^b$ are the fullnesses of virtual buffers at macroblock j—one for each picture type.

The final fullness of the virtual buffer ($d_j^i, d_j^p, d_j^b$: j=MB_cnt) is used as $d_0^i, d_0^p, d_0^b$ for encoding the next picture of the same type.

Next, compute the reference quantization parameter Qj for macroblock j as follows:

$$Q_j = \frac{d_j * 31}{r}$$

where the "reaction parameter" r is given by r=2*bit_rate/picture_rate and dj is the fullness of the appropriate virtual buffer.

The initial value for the virtual buffer fullness is:
$d_0^i$=10*r/31
$d_0^p$=Kp $d_0^i$
$d_0^b$=Kb $d_0^i$ A third step in the process is adaptive quantization.

A spatial activity measure for the marcroblock j is computed from the four luminance frame-organised sub-blocks and the four luminance field-organised sub-blocks using the infra (i.e. original) pixel values:

$$act_j = 1 + \min_{sblk=1,8}(\text{var\_sblk})$$

where $$\text{var\_sblk} = \frac{1}{64}\text{SUM}_{k=1}^{64}(P_k - P\_mean)^2$$

$$P\_mean = \frac{1}{64}\text{SUM}_{k=1}^{64} P_k$$

and Pk are the pixel values in the original 8*8 block.

Normalized actj:

$$N\_actj = \frac{2*actj + \text{avg\_act}}{actj + 2*\text{avg\_act}}$$

avg_act is the average value of actj the last picture to be encoded. On the first picture, avg_act=400.

There mquantj is obtained as:
mquantj=Qj*N_actj where Qj is the reference quantization parameter obtained in step 2. The final value of mquantj is clipped to the range [1 . . . 31] and is used and coded as described in sections 7, 8 and 9 in either the slice or macroblock layer.

This known arrangement has a number of drawbacks. First of all, step 1 does not handle scene changes efficiently.

Also, a wrong value of avg_act is used in step 3 (adaptive quantization) after a scene change.

Finally, VBV compliance is not guaranteed.

Normally, the re-quantization process consists in a block of inverse quantization (IQ) followed by a quantization block (Q). It is mandatory to care about this operation, because the quantization errors can be very important, and they can get worse the images. Optimizations to this process are possible.

When a uniform quantizer is used (as in TM5), it is possible to fuse together the two blocks in only one procedure, reducing both the computational costs and the errors related to this operation.

Starting from the TM5 quantizer, above described, the Inter and Intra quantization error can be analyzed as follows.

Considering a coefficient C, two quantization parameters A and B (with A<B) and the quantization $C_A$ and $C_B$ of C with respect to A and B.

$$C_A = \frac{C}{A} + \varepsilon_A \text{ with } |\varepsilon_A| < 1/2$$

$$C_B = \frac{C}{B} + \varepsilon_B \text{ with } |\varepsilon_B| < 1/2$$

Designating $C_{AB}$ the re-quantization of $C_A$ and with respect to B:

$$C_{AB} = \frac{C_A \cdot A}{B} + \varepsilon_{AB} \text{ with } |\varepsilon_{AB}| < 1/2$$

The re-quantized coefficient CAB must represent C with the minimum error possible, with respect to a direct quantization by the factor B. It has been demonstrated that this is true directly quantizing C respect to B, in other words obtaining the value $C_B$.

The re-quantization error is the difference between $C_{AB}$ and $C_B$

It is possible to demonstrate that:

$$C_A \cdot A = C + A \cdot \varepsilon_A$$

but also:

$$C_{AB} = \frac{C + A \cdot \varepsilon_A}{B} + \varepsilon_{AB} = \frac{A \cdot \varepsilon_A}{B} + \varepsilon_{AB}$$

consequently:

$$|C_{AB} - C_B| = \left|\frac{C}{B} + \frac{A \cdot \varepsilon_A}{B} + \varepsilon_{AB} - \frac{C}{B} - \varepsilon_B\right| = \left|\varepsilon_A \cdot \frac{A}{B} + \varepsilon_{AB} - \varepsilon_B\right|$$

Therefore, the re-quantization error is bigger when the difference between the value A and B is smaller.

SUMMARY OF THE INVENTION

The object of the invention is thus to provide alternative arrangements overcoming the drawback and limitations of the prior art arrangements considered in the foregoing.

According to the present invention, this object is achieved by means of a method having the features set forth in the claims that follow. The invention also relates to a corresponding system as well as computer program product directly loadable in the memory of a digital computer and comprising software code portions for performing the method of the invention when the product is run on a computer.

BRIEF DESCRIPTION OF THE DRAWINGS

The invention will now be described, by way of example only, with reference to the annexed figures of drawing, wherein:

FIGS. 1 and 2, concerning the related art, were already described in the foregoing, FIGS. 3 and 4, with FIG. 3 including two portions designed a) and b), respectively, shows a uniform quantization arrangement and the corresponding error, FIG. 5 shows an arrangement for uniform quantization using subtractive dithering, FIG. 6 shows an arrangement for uniform quantization using non-substractive dithering.

DETAILED DESCRIPTION

Dithered quantization is a technique where a particular noisy signal, called dither, is summed to the input signal, before the quantization step, this step being usually carried out as a uniform quantization step.

As described before, a uniform quantizer implements a correspondence between an analog signal (continuous) and a digital signal (discrete), formed by the collection of levels with the same probability.

In the case of MPEG-2 signals, the input process can be considered as a stationary process $X_n$ with n∈Z where Z represents the real numbers.

Figure 3:
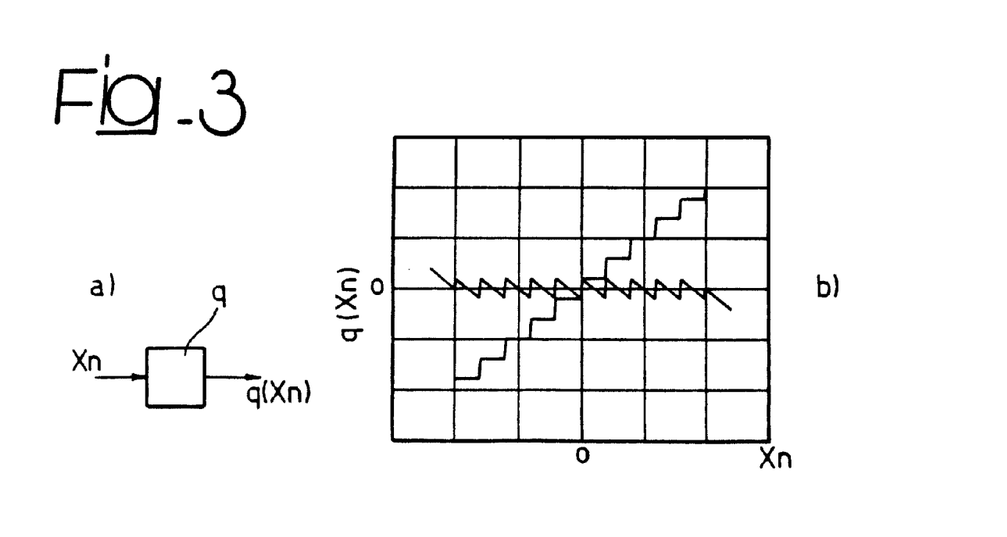

As shown in FIG. 3a, the output of a quantizer block q fed with an input signal $X_n$ is the process $X_n=q(X_n)$. FIG. 3b shows both the typical relationship of $q(X_n)$ to $X_n$ and the quantization error $e_n$.

In a uniform quantizer, the hypothesis is that the quantization error is equal to $e_n=q(X_n)-X_n$. For this reason, the difference between input and output is a sequence of random variables, following a uniform distribution, uncorrelated between them and with the input.

Figures 4, 5, 6:
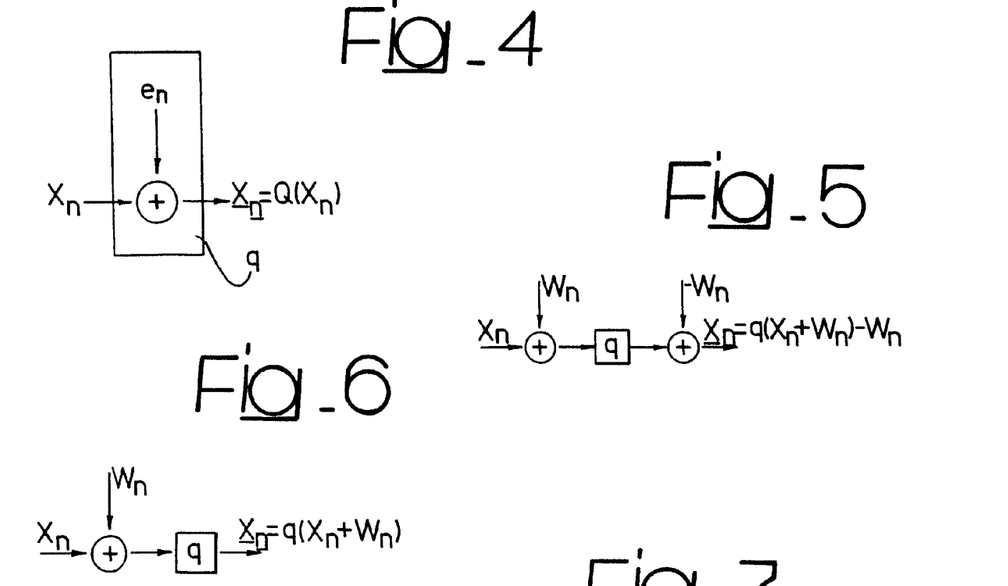

In this case, one can model the quantizer block q(X) as in FIG. 4 where $e_n$, is a sequence of uniform random variables, independent and all distributed in the same way.

This approximation can be acceptable, inasmuch as the number N of quantization levels is high: this condition corresponds to a small quantization step Δ and the probability function of the input signal is smoothed (Bennet approximation).

Using a dithering signal as an input practically corresponds to forcing this condition even if not exactly met.

Two different types of dithering are available: subtractive and non-subtractive.

In the former case, as shown in FIG. 5, a random (or pseudo-random) noise signal is added to the input before quantization, $U_n=X_n+W_n$, and is subtracted after the inverse quantization block, in order to reconstruct the input signal, removing the artifacts due to the non linear characteristic of the quantizer.

When non-subtractive dithering is used as shown in FIG. 6, the input signal of the quantizer is the same, but no correction is applied to the inverse quantized signal.

The introduction of such kind of error modifies the quantization error definition as follow:

$$e_n=q(X_n+W_n)-(X_n+W_n)$$

Therefore, the general difference between the original input and the final output (the quantization error) will be:

$$e_n=q(X-n+W_n)-X_n=e_n+W_n$$

Between the two types of dithering strategies, using the non-subtractive scheme is preferable for a number of reasons.

First of all, even though having several advantages, subtractive dithering is difficult to implement in a real system, because the receiver needs to be very tightly synchronized with the transmitter, and this is not the case.

Moreover, transmitting the generated random sequence together with the sequence also is hardly acceptable, as this will occupy a lot of space in the compressed stream, and this only to transmit noise.

Secondly, subtractive dithering implies high arithmetic precision (so a large number of bits), but generally, integer variables are used.

Several other factors need be considered when using a dithered approach for transcoding.

A first factor is the target bitrate: data compression is obtained using an efficient VLC of the quantized DCT coefficients after the Run-Length coding. Analyzing re-quantization and the effects deriving from dithering, shows that applying this technique to all the DCT coefficients may not be advantageous.

This is because in the high frequency part of the DCT coefficients matrix, several zero coefficients will modified to non-zero coefficients: this complicates the task of the subsequent VLC step, as these non-zero coefficients coefficients can no longer be compressed to one symbol as it would be the case for zero coefficients.

For this reason, the output bit-rate will be higher: so, the rate controller will increase the quantization parameter mQuant, in order to follow the target bi-rate fixed, which would adversely affect the final image quality.

Figure 7:
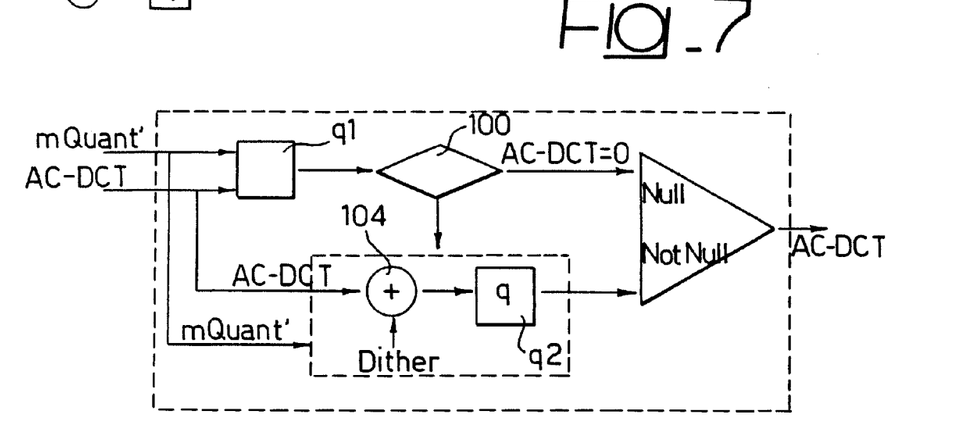
FIG. 7 is a block diagram of a dithered re-quantizer.

The arrangement shown in FIG. 7 implies a double re-quantization cycle: for each coefficient considered, a value re-quantized with the normal procedure (i.e. without dither) is calculated.

If the coefficient is zero, which is ascertained in a block downstream of the uniform quantizer q1, this will be directly fed to the final stream via a multiplexer module 102.

Otherwise, for the non-zero coefficients—and only fo these, the re-quantized value is calculated again with the dithering procedure.

Specifically, in the block diagram of FIG. 7 reference 104 indicates a summation mode (adder) where a dither signal is added to the AC-DCT signal upstream of another uniform quantizer q2, whose output is fed to the multiplexer 102.

Quite obviously, the "parallel" arrangement shown in FIG. 7 that provides for the use of two quantizers q1 and q2 also lends itself to be implemented as a time-shared arrangement using a single quantizer only.

The type of dither noise added before the quantization is significant. Its characteristics must be such as to uncorrelate the final quantization error from the input of the quantizer (the dithered original signal).

Different types of noise may be used by adapting the characteristic function of the process that generates them: gaussian, uniform, sinusoidal and triangular.

Any known procedure for pseudo-random variable generation with uniform distribution can be used to advantage in order to subsequently modify its distribution to obtain e.g. a gaussian or triangular distribution.

In the case considered, a triangular distribution gives the best results, triangular noise being obtained as the sum of two independent, uniformly distributed pseudo-random variables.

The ratio between the input and the output mQuant is to be taken into account, in that it is not always convenient to insert the noise signal before the linear quantization.

From another point of view, when the input and the output mQuant are similar (equal or multiples), randomly correcting the coefficients may not be advantageous, so the dither is not applied in this condition.

Different implementations of the output bitrate controller are thus possible for transcoding, with or without image size downsampling.

The Constant Bit Rate (CBR) approach, rather that the Variable Bit Rate (VBR), is usually preferred: CBR is in fact representative of the real worst case, and, in general, a variable bit rate control algorithm can be intended as a constant one where the parameters are relaxed.

The transcoding process is useful for decreasing the bit rate of a source data, in order, typically, to permit the contents to be conveyed over different channels with different available bandwidths, without giving rise to a long latency due to the receding process.

A rate control algorithm can be derived from the TM5 approach and adapted by using e.g. the same level of local feedback (picture level) and the same global target bit calculation (GOP level).

For the complexity calculation $X_j$, instead, the need exists of distinguishing between those bits needed for the so-called overhead (basically the headers, the motion vectors, etc.) and those bits allocated for the DCT coefficients, which are more correlated with the real image complexity.

The incoming bit-stream is already quantized using the visibility matrices, and the chosen quantization parameter "mquant" carries the information of the local quality of each single macroblock. From this one can assume that the only one control variable is the quantization mquant:

$$q_j = \text{mquant}$$

This decision is useful, in order to obtain a global control more stable.

Having only one variable to be controlled, the dynamic range thereof is over a one-dimensional domain, where it is easier to work (also from the implementation point of view). Moreover, the macroblocks activity is not recalculated and, we rounding error due to the visibility matrices multiplications and divisions can be avoided. All the calculations are performed in fixed point, with a limited dynamic.

To stabilize the system, a preanalysis block is added between the global control and the local one.

A viable arrangement is a mixed feedback and feedforward approach.

Upstream of the local control loop, a preanalysis routine is inserted, where each single picture is quantized (picture-preanalysis) with an hypothetic value of mquant (chosen experimentally after several simulations): at this point it is possible to count how many bits are spent in this condition, and take advantage from this information. The preanalysis result is called BUP (Bit Usage Profile): the following final quantization routine can adjust the used mquant, basing its decisions on these values.

Summarizing, preanalysis provides information to the local control routine: this is not only a complexity measure of each picture, but also an estimation between the number of bits spent for each DCT coefficient coding, and the bits spent for the overhead (header, motion vectors), that are a structural fixed payload, without changing the output standard.

Locally, instead of a proportional control 8 as this is the case of TM5), a proportional-integrative (PI)control described is used, e.g.:

$$u(t) = K_p \cdot \left[ e(t) + \frac{1}{T_i} \int_0^t e(r)\delta r \right] + u_0$$

where e(t) is the instantaneous error function: $e(t)=y^0(t)-y(t)$. $K_p$ is called the proportional action coefficient, T is the integration time (this must not be confused with the target bits) and then, the constant $K_i$ is the ratio between $K_p$ and $T_i$, called integral action constant.

The two constants $K_p$ and $K_i$ indicate the reactivity of the controller with respect to the proportional and integrative error. In this case, the only observable variable is the generated number of bits. An index proper does not exist that can measure the real quality of the coded images. So one may assume that $y^0(t)$ is a distribution of bits as follows:

$$\int_{start-pict.}^{end-pict.} y^0(t)\delta t = \text{Picture Target Bits}$$

This type of control reduces the effect of a systematic error over the GOP under transcoding. For output bit rates higher than 4 Mbit/s, $K_i$ and $K_p$ can be assumed as constants. From the experiments, the mquant values very rarely approach the limit of the linear quantization "staircase".

In the global control level, the target bits are assigned for each single picture of a GOP. In the implemented rate control the assumption is made, as in TM5, that image complexity can be correlated with its predecessor of the same type I, P or B.

The calculation of the complexity and the targets is performed differently from TM5. The assumption is made that in current GOP there are R available bits and k pictures already coded so that:

$$R_l = R - \sum_{n=0}^{k-2} S[n]$$

where $R_1$ are the remaining bits (left) to be used to encode the following N-k pictures. If T[n] is the target for the picture n of the GOP, then:

$$R_l = R - \sum_{n=k}^{N-1} T[n]$$

and then:

$$R_l = N_I \cdot T_I + N_P \cdot T_P + N_B \cdot T_B$$

For any picture type (i), the target bits are the sum of the bits spent for the overhead ($O_i$) and the bits spent for the DCT coefficients ($C_i$)

$$T_i = C_i + O_i$$

With these definitions, the image complexity $X_i$ can be calculated as follows:

$$X_i = C_i Q_i$$

where Qi represents the average mquant (from the preanalysis) and Ci, is related only to the bits spent for the DCT coefficients encoding.

The proportional constants $K_{IP}$ and $K_{IB}$ can be determined as follows:

$$K_{IP} = \frac{Q_P}{Q_I}; K_{IB} = \frac{Q_B}{Q_I}$$

The expressions for the target bit, used for the global control level are then derived, obtaining:

$$\hat{R}_I = R_I - (N_I \cdot O_I + N_P \cdot O_P + N_B \cdot O_B) = N_I \cdot C_I + N_P \cdot C_P + N_B \cdot C_B$$

$$C_I = \frac{\hat{R}_I \cdot X_I}{N_I \cdot X_I + \frac{N_P \cdot X_P}{K_{IP}} + \frac{N_B \cdot X_B}{K_{IB}}}$$

$$C_I = \frac{C_I \cdot X_P}{K_{IP} \cdot X_I}$$

$$C_I = \frac{C_I \cdot X_B}{K_{PB} \cdot K_{IP} \cdot X_I}$$

Even if the MPEG-2 standard (Main profile @ Main level at standard TV resolution) allows transmissions with data rate up to 15 Mbit/s, the real low limit of its applicability range (in order to obtain always good image quality) is about 4 Mbit/sec: below that limit, the visual quality is not good enough, and different processing techniques need be applied.

One possibility is to reduce the frame rate simply skipping some frames; another, more complex approach that also preserves more "global" sequence quality, is to downsize each image, reducing its dimension to ½ or ¼.

Figure 8:
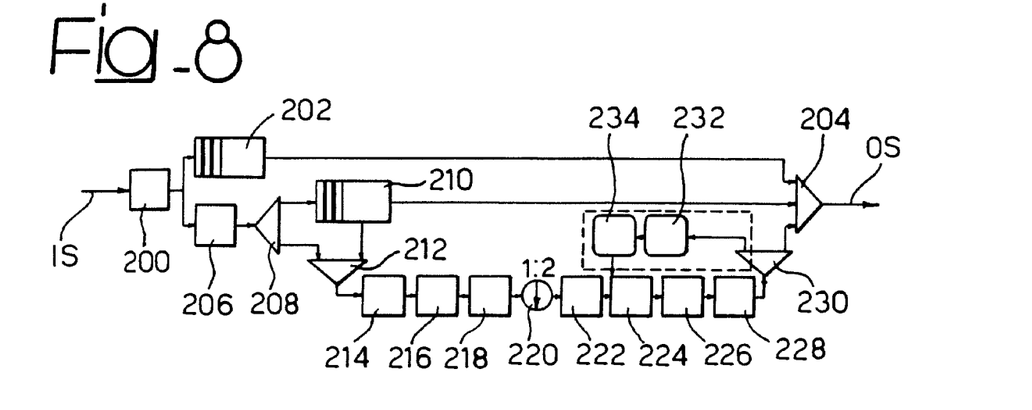
FIG. 8 is a block diagram of a downsampling transcoder.

An arrangement applying that principle is shown in FIG. 8, where references IS and OS indicate the video input and output sequences, respectively.

Reference 200 designates the sequence GOP header that feeds a sequence GOP data delay memory 202, that in turn feeds an output multiplexer 204.

The header 200 also feeds a picture header 206 that, via a multiplexer 208, feeds a local cache memory 210 adapted to cooperate with the multiplexer 204 as well as still another multiplexer 212.

The multiplexer 212 receives input signals from the multiplexer 208 and the memory 210 and feeds them to a processing chain including a cascaded arrangement of:
  an inverse VLC (I-VLC) block 214,
  an inverse RL (I-RL) block 216,
  a low-pass filter 218,
  a 1:2 downsampler block 220,
  an inverse quantizer 222 followed by a quantizer 224,
  a RL coding block 226,
  a VLC coding block 228, and
  a multiplexer 230 arranged to alternatively send the signal from the VLC block 228 to the output multiplexer 204 or a picture preanalysis chain comprised of a bit profile usage module 232 and a rate control (Mquant) module 234 which in turn controls the quantizer 224 by adjusting the quantization step used therein.

To sum up, the system shown in FIG. 8 includes two additional blocks (that can be incorporated to one): the low pass filter 218 and the downsampler 220.

Even if the syntax is the same, the output bitstream OS will no longer be strictly MPEG-2 compliant, because macroblocks are encoded over 8 pixel width and height while MPEG-2 only allows 16 pixels as the macroblock dimensions.

So a specific decoder working on low-resolution anchor frames may be required. Alternatively, by changing slightly the syntax of the headers and the output VLC block, an H.26L compliant bit-stream can be produced.

H.26L is an emerging standard, expected to be largely used in the near future and probably to substitute the MPEG-4 standard in wireless communications, also known as H.264.

An advantage of this technique is that the decoding process is performed on low-resolution images, largely reducing the blocking artifacts. These considerations are also confirmed by measuring the block artifact level factor with the GBIM technique (see "A generalized block-edge impairment metric for video coding", H. R. Wu and M. Yuen, IEEE Signal Processing Letters, vol. 4, No. 11, November 1997).

At least two different implementations of the system can be envisaged.

In a first embodiment, low pass filtering is performed before preanalysis: in this case the block dimensions will remain 8×8 pixels, but only the low frequency portion (4×4 pixels) will be not-zero. In this case, the result is sub-optimal, but the advantage is that the output bit-stream will still be MPEG-2 compliant.

Alternatively, together with the low-pass filtering, a decimation phase is executed: the blocks will be 4×4 pixels large, and the subsequent RL and VLC coding steps will be effected on this structure, generating a non MPEG-2 bit-stream. With this approach a better quality can be reached.

The MPEG-2 video standard exhibits some limitations for low bit-rates: the most evident one is that the hierarchy syntax is very rigid and cannot be changed, according to what is really written into the bit-stream.

The transcoder does not execute a complete recoding of the bit-stream content, but reduces the information carried by the DCT coefficients with a stronger quantization. This implies that all the semantic structures of the incoming bit-stream (headers, motion vectors, but also the macroblocks number) are not changed and the bits used for this part of the stream will be more or less copied into the output one (syntax overhead).

For this reason, for very low bit-rates (under 1.5 Mbit for a Dl incoming image format and CIF as output), it is not fair to compare this approach versus a complete decoding-filtering-reencoding process, because in this last case, ¼ of the incoming macroblocks will be encoded, reducing by roughly a factor 4 the named overhead.

In any case, this second approach requires, in addition to a complete decoding of the incoming stream, a new motion estimation and a bigger latency with the output: this latter limitation could be quite significant e.g. in video-conferencing applications, where interactivity of the speakers (two or more) must be very strict.

Moreover, under these conditions, the possible dynamics of the mquant variations are reduced, because the quantization parameters used are close to their upper limit. For that reason, any large variation with respect to the average mquant will be very visible, and the controller will must take in account also this problem.

Also, the rate control implementation can be different, according to the application and the data bandwidth available on the transmission (or storage) channel. For a CBR channel with low capacity (less than 1.5 Mbit/second) and low latency a very precise rate control is important, accepting some block artifacts.

The situation is different if the only constraint is the final dimension of the data stream (consider an HDD or a magnetic support): in this case, a smaller local precision can be tolerated.

In the preferred implementation of the transcoding system, two different variations of the rate control are provided for low bitrate applications and only one for high bitrate.

The difference between the two types of rate control for low bit rate applications lies in how the local feedback is taken in account and in the preanalysis step.

The two controllers can be termed "High" and "Low" feed-back: in both instances, the basic structure is comprised of global control (for the target calculation), preanalysis and a local feed-back loop, and the parameters depend from the input and output bitrates.

In the cases of a low bitrate, in the target bit rate calculation, a proportional control parameter is needed ($K_p$): this constant can be parametrized, depending on the input/output bit rate as follows:

$$K_p = \frac{DestBitrate}{SourceBitrate - DestBitrate}$$

This is shown in FIG. 14, where the value of K-Prop ($K_p$) is shown as a function of the input bitrate and the output bitrate. In order to enhance the precision of the preanalysis (in terms of mquant calculated) the mquant used to find the BUP (Bit Usage Profile) must also be made parametrical.

In particular, if for high bitrates a fixed value V can be used, for low bit rates an offset is added to this value. Such an offset depends again from the difference between the input and the output bitrate.

At the end of the preanalysis, two different working conditions are present concerning the BUP.

The former one is verified when we are in the condition of "high feedback", the BUP is calculated as explained before. When a low feedback is chosen, a new contribution is needed as the derivative.

If, the mquant value is calculated "proportionally", a correction must be done as follow:

$$mq(t) = K_D \frac{\partial mq(t)}{t}$$

In a preferred embodiment, as derivative estimation, the difference between the re-quantization mquant value of the current macroblock and the average of the previous picture has been chosen.

The derivative contribution is introduced, in order to delay possible abrupt variation in the local control, and render the control more stable.

The value of the constant KD is then negative, and it depends again on the input and output bit rates:

$$K_D = K_D \frac{(SourceBitrate - DestBitrate)}{DestBitrate}$$

The proportional constant in the local control, that is proportional and integrative when the control is tight, is very low (down to 0): only the integrative contribution remains important. This fact allows a very precise control of the final dimension of each GOP, and the absence of proportional control prevents eventually fast variation of the mquant.

Figure 10:
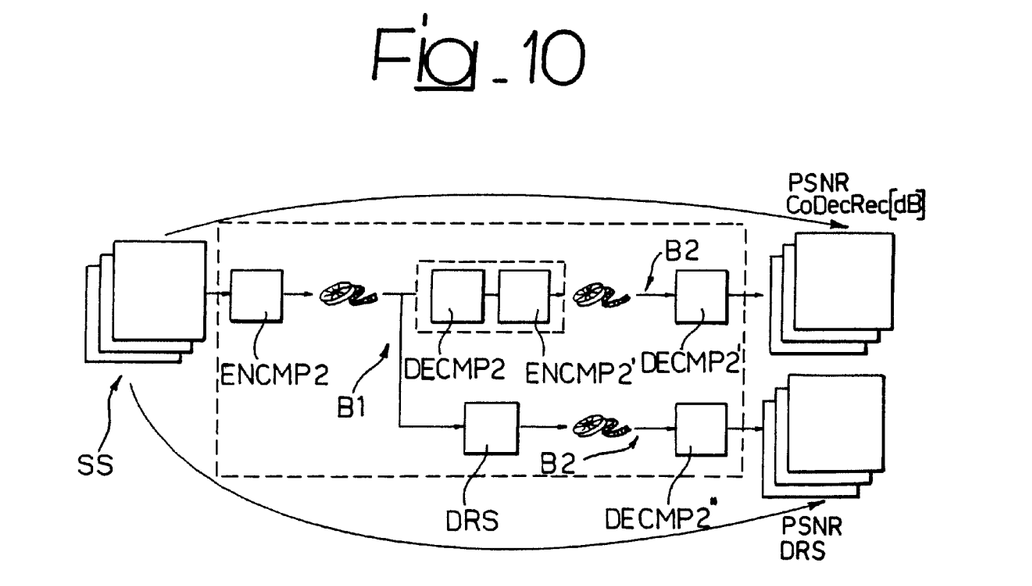
FIG. 10 shows a basic quality evaluation scheme for use in the context of the invention.

The arrangement disclosed herein has been evaluated in terms of quality by referring to the scheme shown in FIG. 10, where source samples SS are fed into an MPEG-2 encoder ENCMP2.

Figure 9:
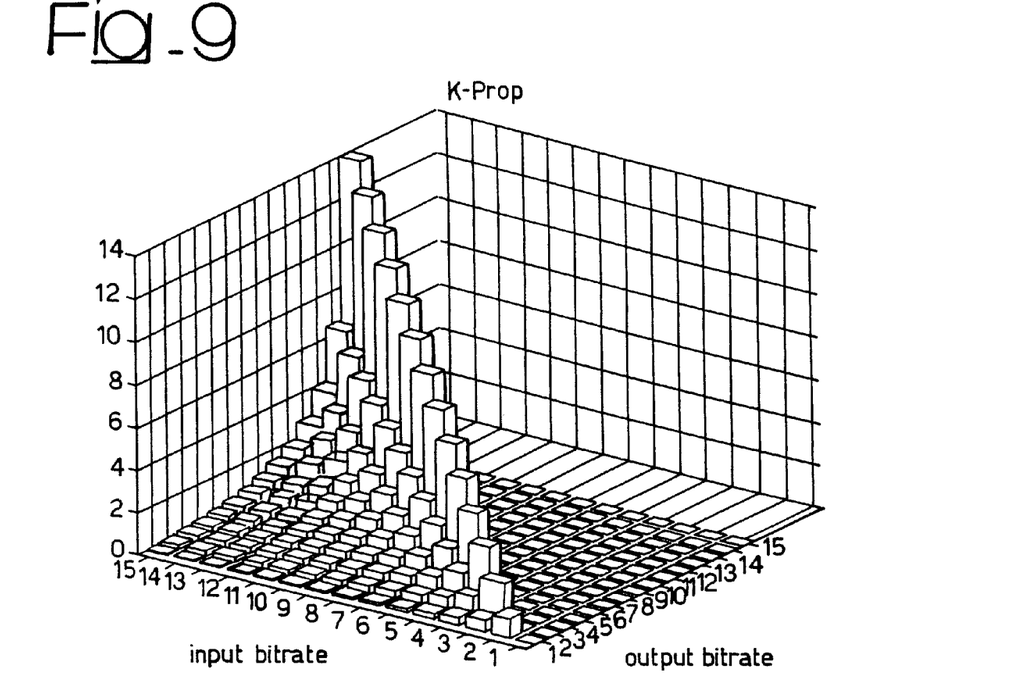
FIG. 9 is a three-dimensional diagram showing the relationship of output bitrate to input bitrate in an arrangement disclosed herein.

The coded data bitstream, at a bitrate B1 was fed in parallel to:

a decoding/re-encoding chain including an MPEG-2 decoder DECMP2 followed by another MPEG-2 encoder ENCMP2' to re-encode the samples at a lower bitrate B2 in view of feeding to a further MPEG-2 decoder DECMP2', and a downsampling transcoder DRS essentially corresponding to the diagram of FIG. 9, configured to transcode the video signal at the bitrate B2 followed by another MPEG-2 decoder DECMP2".

The goal of these measures is to ascertain whether the final quality is increased as a result of dithering being added to the quantization block of re-quantization.

The sequences used exhibit different characteristics, as number of details per frame (Mobile & Calendar), or global movements like panning (FlowerGarden), etc.

Two different criteria have been used for the quality evaluation.

The former is objective quality measurement, through the PSNR (Peak Signal Noise Ratio) index.

The latter is subjective quality evaluation, watching the sequences via professional equipment (an image sequence processor called 'Digitale VideoSysteme' and a 'Barco' CVM3051 monitor).

The PSNR measures reported in Table 1 confirm the enhancement of the quality using the dithered re-quantization.

In the table below, the results obtained transcoding from 7 Mbit/s to 3/2/1.5 Mbit/sec are presented. These numbers are compared with the rate control with high (local proportional-integrative) and low (preanalisys proportional-derivative and local integrative) feedback. The sequence is the Philips one, 725 progressive PAL frames, 25 frame/sec, D1 resolution (720×576) down to CIF (360×288).

It is also evident that the quality gain depends from the final target bitrate and from the sequence content: the gain becomes important when dithering can work well. In other words, when the original sequence is full of details and movements, the gain will be higher: in any case, the final images are never damaged, and in the worst case, the gain will is null.

It is also important to underline that the quality gain is interesting (about 1 dB) in the middle range of quality (i.e. between 25 and 35 dB) where it is more visible; for higher quality (from 40 to 45 dB) the gain is less, but also its visibility cannot be high, because the starting quality is already very high.

Other tests have been performed on a different D1 progressive sequence, transcoding with downsampling to 2 and 1.5 Mbit/s.

For each sequence used, the main characteristics were as follows:

1. Demoiselle: PAL D1, 720×576×25 f/s, 1000 frames;
2. Titan: PAL D1, 720×576×25 f/s, 930 frames;
3. Philips: PAL D1, 720×576×25 f/s, 700 frames;
4. Twister: PAL D1, 720×576×25 f/s, 1000 frames.

The results are summarized in Table 2 below.

TABLE 2

Low feedback rate control
File size in bytes, $K_{IP} = 1.0$, $K_{PR} = 1.0$

| Sequence | Target 2 Mbit | File size | % Err. | Target 1.5 Mb | File Size | % Err. |
|---|---|---|---|---|---|---|
| Demoiselle | 1000000 | 9862370 | −1.38 | 7500000 | 7211351 | −3.80 |
| Titan | 9320000 | 9191424 | −1.38 | 7110000 | 6932480 | −2.50 |
| Philip | 7080000 | 6867596 | −2.80 | 5310000 | 5217141 | −1.75 |
| Twister | 10000000 | 9818110 | −1.80 | 7500000 | 7199840 | −4.0 |

TABLE 1

High and Low feed-back comparisons:
file size in bytes with $K_{IP}$ and $K_{IP} = 1.0$

| BitRate | Target | Low feed-back | % Err. | High feed-back | % Err. |
|---|---|---|---|---|---|
| 1.5 Mbit/s | 5437500 | 5310112 | −2.34 | 5255598 | −2.9 |
| 2.0 Mbit/s | 7250000 | 7114829 | −1.86 | 7124522 | −1.73 |
| 3.0 Mbit/s | 10875000 | 10684687.50 | −1.75 | 10687411 | −1.72 |

As regarding the simulation results in terms of PSNR (Peak Signal to Noise Ratio), several transcoding bitrates have been tested: in particular from 10 to 4, from 7 to 4 and from 4 to 4 Mbit/second.

This latest case is useful to check if the dither signal can adversely affect the transcoding process, when the characteristic curves of input and output are the same. In any case, the fact must be taken into account that this case cannot exist in the real system because under these circumstances the transcoder will simply forward the input bitstream IS to the output OS, without any processing. Additional results are provided in Table 3 below.

TABLE 3

Mean PSNR (dB) (Dithered vs. Standard Re-quantization)

| | 7 to 4 Mbits | | | 10 to 4 Mbit/sec | | | 4 to 4 Mbit/sec | | |
|---|---|---|---|---|---|---|---|---|---|
| | Y | U | V | Y | U | V | Y | U | V |
| Mobile&Calendar | 0.83 | 0.77 | 0.75 | 1.05 | 0.86 | 0.82 | 0.06 | 0.00 | 0.00 |
| Flowe&rGarden | 0.92 | 0.32 | 0.36 | 0.93 | 0.39 | 0.50 | 0.19 | 0.05 | 0.07 |
| Brazilg | 0.40 | 0.02 | 0.10 | 0.10 | 0.01 | −0.09 | 0.00 | −0.02 | −0.01 |
| Stefan | 0.68 | 0.46 | 0.55 | 0.59 | 0.48 | 0.55 | 0.00 | −0.01 | −0.02 |
| Fball | 0.18 | 0.08 | 0.06 | 0.02 | 0.00 | 0.00 | 0.00 | 0.00 | 0.01 |

Table 3 shows that the luminance component is never damaged (positive numbers means a gain of the dithered approach with respect to the traditional one).

Concerning the chrominance components (U and V) in some special conditions (e.g. when the sequence is not rich of details) very small degradation may occur: this is not visible and does not change the general behaviour of the system.

In the worst case (transcoding to the same output bitrate as the input one) there are not evident losses of quality: so using the dithering also in this condition does not introduce loss of quality, with respect to standard re-quantization. In very smoothed and uniform sequences, like Brazilg) or sequences exhibiting frequent scene cuts and movements changes (like Fball), the gain is smaller than in the other cases. For very detailed sequences like Mobile & Calendar, instead, the average gain can reach up to 1 dB.

Analysis of scattergrams for luminance and chrominance are shows that the dithered approach is better in the range of quality between 25 and 35 dB, where the advantageous effects are clearly detectable.

Essentially, the arrangement disclosed herein enhances the quality achievable in a system for transcoding multimedia streams without introducing complexity. Re-quantization is very easy to implement, and lead to better final quality, without any drawback.

A gain in quality is thus achieved, without introducing complexity in the systems. This is a significant point as video transcoding techniques are becoming more and more important for a broad range of applications in the consumer electronics field: this particular approach can be easily applied, enhancing performance of the transcoding system.

Of course, the underlying principle of the invention remaining the same, the details and embodiments may vary, also significantly, with respect to what has been described and shown by way of example only, without departing from the scope of the invention as defined by the annexed claims.

We claim:

1. A method of converting digital signals between a first and a second format, the method comprising:
    generating coefficients representative of said digital signals;
    subjecting said coefficients to a first quantization to generate an undithered quantized coefficient;
    checking if said undithered quantized coefficient is equal to zero, such that
        when said undithered quantized coefficient is equal to zero, taking said undithered quantization coefficient as a quantized signal, and
        when said undithered quantized coefficient is different from zero, generating a dither signal, and adding said dither signal to said coefficients before said first quantization to generate a dithered coefficient and subjecting said dithered coefficient to a quantization step to generate a dithered quantized signal.

2. The method of claim 1, wherein subjecting said coefficients to quantization comprises subjecting said coefficients to a uniform quantization.

3. The method of claim 1, further comprising:
    subjecting said quantized signal to inverse quantization; and
    subtracting said dither signal from said signal subjected to inverse quantization.

4. The method of claim 1, wherein the spectrum of said dither signal is gaussian, uniform, sinusoidal or triangular.

5. The method of claim 4, wherein said dither signal is generated as a pseudo-random variable having a uniform distribution by subsequently modifying said distribution to at least one distribution of said group.

6. The method claim 1 wherein said dither signal is generated from a plurality of independent pseudo-random variables.

7. The method of claim 1 further comprising subjecting said digital signals to a discrete cosine transform to generate said coefficients to be quantized as discrete cosine transform coefficients.

8. The method of claim 1, wherein said quantization comprises a part of a transcoding process between an input stream of digital signals at a first bitrate and an output stream of digital signals at a second bitrate, said second bitrate of said output stream of digital signals being selectively controlled.

9. The method of claim 8, further comprising conducting a preanalysis process on said input stream including:
    quantizing said signals with a given quantization step; and
    evaluating the number of bits spent for coding said coefficients, and in that said bitrate of said output data stream is controlled as a function of said preanalysis.

10. The method of claim 9, further comprising controlling said data stream with a proportional-integrative control.

11. The method of claim 9, wherein said input stream comprises a stream of digital video signals including pictures arranged in groups of pictures, and wherein said bitrate control assigns a value of target bits for each single picture of a group of pictures.

12. The method of claim 1, wherein said quantization comprises part of a transcoding process between an input stream of digital signals at a first bitrate and an output bitrate at a second bitrate, said transcoding process including subjecting at least part of said input digital signals to low pass filtering step followed by downsampling.

13. The method of claim 12, wherein said low pass filtering is performed before conducting a preanalysis process.

14. The method of claim 12, further comprising executing a decimation phase.

15. The method of claim 1, wherein said digital signals comprise, in at least one of said first and second formats, MPEG encoded signals.

16. A system for converting digital signals between a first and second format, the system being configured for generating coefficients representative of said digital signals comprising:
    a first quantizer for subjecting each said coefficient to a first quantization step to generate an undithered quantized coefficient;
    a control module for checking if said undithered quantized coefficient is equal to zero;
    an output element for taking said undithered quantization coefficient as a quantized signal when said undithered quantized coefficient is equal to zero;
    a source of a dither signal;
    an adder for adding said dither signal to said coefficient when said undithered quantized coefficient is different from zero; and
    a second quantizer for subjecting said dithered coefficient to a quantization step to generate said quantized siqnal for feeding to said output element.

17. The system of claim 16 wherein said quantizer comprises a uniform quantizer.

18. The system of claim 16 further comprising:
    an inverse quantizer for subjecting said quantized signal to inverse quantization; and a subtractor for subtracting said dither signal from said signal subjected to inverse quantization.

19. The system of claim 16, wherein said source of said dither signal comprises a gaussian, uniform, sinusoidal or triangular signal source.

20. The system of claim 19, wherein said source comprises a source of a pseudo-random variable having a uniform distribution.

21. The system of any of claims 16, wherein said source of dither signal includes a plurality of sources of independent pseudo-random variables.

22. The system of claim 16 further comprising a discrete cosine transform module for subjecting said digital signals to a discrete cosine transform to generate said coefficients to be quantized as discrete cosine transform coefficients.

23. The system of claims 16, further comprising means for transcoding an input stream of said digital signals at a first bitrate into an output stream of digital signals at a second bitrate, including a bitrate control block for selectively controlling said second bitrate of said output stream of digital signals.

24. The system of claim 23, further comprising a preanalysis chain for subjecting said input stream to a preanalysis process, said chain including:
a quantizer for quantizing said signals with a given quantization step; and
a bit usage profile module for evaluating the number of bits spent for coding said coefficients,
wherein said bitrate control block is configured for controlling the bitrate of said output data stream as a function of said preanalysis.

25. The system of claim 24, wherein said bitrate control block comprises a proportional-integrative controller.

26. The system of claim 24, for use in connection with an input stream of digital video signals including pictures arranged in groups of pictures, wherein said bitrate control block is configured for assigning said value of target bits for each single picture of a group of pictures.

27. The system of claim 16, wherein said quantizer for transcoding an input stream of digital signals at a first bitrate into an output bitrate at a second bitrate, including a low pass filter and a downsampling module for subjecting at least part of said input digital signals to lowpass filtering and downsampling.

28. The method of claim 27, wherein said low pass filter is arranged upstream of a preanalysis chain.

29. The system of claim 27, further comprising a decimation module.

30. A computer program product directly loadable in the internal memory of a digital computer and including software code portions for performing, when the product is run on a computer, a method of converting digital signals between a first and a second format, the method comprising:
generating coefficients representative of said digital signals;
subjecting said coefficients to quantization;
generating a dither signal; and
checking if said quantized coefficient is equal to zero, such that when said quantized coefficient is equal to zero, taking said quantization coefficient as a quantized signal, and
when said quantized coefficient is different from zero, adding said dither signal to said coefficients before said quantization to generate a dithered coefficient and subjecting said dithered coefficient to quantization to generate a dithered quantized signal.

31. A method of converting digital signals between a first and second format, the method comprising:
subjecting said digital signals to a discrete cosine transform to generate coefficients representative of said digital signals;
generating a dither signal;
adding said dither signal to said coefficients and subjecting said coefficients to which said dither signal has been added to quantization to generate a quantized signal;
subjecting such quantized signal to inverse quantization; and
leaving said signal subjected to inverse quantization exempt from subtraction therefrom of dither signal, wherein said signal subjected to inverse quantization contains artifacts due to the non-linear characteristic of said quantization.

32. The method of claim 31, wherein said quantization step is a uniform quantization step.

33. The method of claim 31, wherein the spectrum of said dither signal is selected from the group consisting of gaussian, uniform, sinusoidal and triangular.

34. The method of claim 31, wherein said dither signal is generated as a pseudo-random variable having a uniform distribution by subsequently modifying said distribution to at least one distribution of said group.

35. The method of claim 31, wherein said dither signal is generated from a plurality of independent pseudo-random variables.

36. The method of claim 31, wherein said quantization is a part of a transcoding process between an input stream of digital signals at a first bitrate and an output stream of digital signals at a second bitrate, said second bitrate of said output stream of digital signals being selectively controlled.

37. The method of claim 31, wherein said input stream is subject to a preanalysis process including:
quantizing said signals with a given quantization step; and
evaluating the number of bits spent for coding said coefficients, and in that said bitrate of said output data stream is controlled as a function of said preanalysis.

38. The method of claim 36, wherein said control is of a proportional-integrative type.

39. The method of claim 31, wherein said input stream is stream of digital video signals including pictures arranged in groups of pictures, and in that said bitrate control assign value of target bits for each single picture of a group of pictures.

* * * * *